US012762891B2

(12) United States Patent
Wang et al.

(10) Patent No.: US 12,762,891 B2
(45) Date of Patent: Oct. 13, 2026

(54) INFORMATION PROCESSING METHOD AND ELECTRONIC DEVICE

(71) Applicant: VIVO MOBILE COMMUNICATION CO., LTD., Dongguan (CN)

(72) Inventors: Bin Wang, Dongguan (CN); Yonghang Xiang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 495 days.

(21) Appl. No.: 17/968,789

(22) Filed: Oct. 18, 2022

(65) Prior Publication Data

US 2023/0040115 A1 Feb. 9, 2023

Related U.S. Application Data

(63) Continuation of application No. PCT/CN2021/088357, filed on Apr. 20, 2021.

(51) Int. Cl.
*G06V 40/16* (2022.01)
*G02B 27/01* (2006.01)
(Continued)

(52) U.S. Cl.
CPC ....... *G06V 40/172* (2022.01); *G02B 27/0172* (2013.01); *G06Q 10/40* (2026.01);
(Continued)

(58) Field of Classification Search
CPC .. G06V 40/172; G06V 40/161; G06V 10/761; G06V 40/167; G02B 27/0172;
(Continued)

(56) References Cited

U.S. PATENT DOCUMENTS

2015/0237660 A1* 8/2015 Cui ....................... H04W 8/005 455/41.2
2015/0269420 A1 9/2015 Kim et al.
(Continued)

FOREIGN PATENT DOCUMENTS

CN 101001149 A 7/2007
CN 103312382 A 9/2013
(Continued)

OTHER PUBLICATIONS

Notice of reason of Refusal issued in related Japanese Application No. 2022-563381, mailed Mar. 19, 2024, 3 pages.
(Continued)

*Primary Examiner* — Emily C Terrell
*Assistant Examiner* — Dominique James
(74) *Attorney, Agent, or Firm* — IPX PLLC

(57) ABSTRACT

An information processing method and an electronic device are provided. The method is performed by a first wearable device, where the first wearable device includes a first image collector, and the method includes: obtaining a second face image by the first image collector and receiving a first face image from the second wearable device in a case that the first wearable device and a second wearable device are in a preset positional relationship; and processing first target information from the second wearable device in a case that the first face image matches the second face image.

14 Claims, 7 Drawing Sheets

(51) Int. Cl.

| | |
|---|---|
| ***G06Q 10/40*** | (2026.01) |
| ***G06V 10/74*** | (2022.01) |
| ***H04L 67/06*** | (2022.01) |

(52) U.S. Cl.
CPC .......... *G06V 10/761* (2022.01); *G06V 40/161* (2022.01); *H04L 67/06* (2013.01); *G02B 2027/0178* (2013.01)

(58) Field of Classification Search
CPC .... G02B 2027/0178; G02B 2027/0138; G02B 2027/014; H04L 67/06; H04L 67/12; G06F 21/445; G06F 21/32; G06F 21/45; G06Q 50/01
See application file for complete search history.

(56) References Cited

U.S. PATENT DOCUMENTS

| | | | | |
|---|---|---|---|---|
| 2015/0324567 | A1 | 11/2015 | Chiang et al. | |
| 2017/0078295 | A1 | 3/2017 | Hwang | |
| 2017/0280018 | A1 * | 9/2017 | Morita | H04N 1/4433 |
| 2020/0250445 | A1 * | 8/2020 | Papineau | G01S 5/0027 |

FOREIGN PATENT DOCUMENTS

| | | | | | |
|---|---|---|---|---|---|
| CN | 104348977 | A | | 2/2015 | |
| CN | 105229567 | A | | 1/2016 | |
| CN | 105426400 | A | * | 3/2016 | |
| CN | 105938526 | A | | 9/2016 | |
| CN | 106331987 | A | | 1/2017 | |
| CN | 107426069 | A | | 12/2017 | |
| CN | 108702602 | A | * | 10/2018 | G06F 21/32 |
| CN | 108712729 | A | | 10/2018 | |
| CN | 108734595 | A | | 11/2018 | |
| CN | 105468767 | B | * | 3/2019 | G06K 9/00228 |
| CN | 111444491 | A | | 7/2020 | |
| CN | 111796785 | A | * | 10/2020 | G06F 3/1446 |
| EP | 3422172 | A1 | | 1/2019 | |
| IN | 101964052 | A | | 2/2011 | |
| JP | 2014134908 | A | | 7/2014 | |
| KR | 20190075988 | A | | 7/2019 | |
| WO | WO-2019052385 | A1 | * | 3/2019 | G06Q 10/40 |

OTHER PUBLICATIONS

Office Action issued in related Korean Application No. 10-2022-7039760, mailed May 15, 2024, 7 pages.
Extended European Search Report issued in related European Application No. 21793551.9, mailed Aug. 11, 2023, 7 pages.
Notice of reason of Refusal issued in related Japanese Application No. 2022-563381, mailed Dec. 5, 2023, 3 pages.
International Search Report issued in corresponding International Application No. PCT/CN2021/088357, mailed Jul. 7, 2021, 4 pages.
First Office Action issued in related Chinese Application No. 202010310971.1, mailed Feb. 7, 2021, 8 pages.
Second Office Action issued in related Chinese Application No. 202010310971.1, mailed Jun. 17, 2021, 5 pages.

* cited by examiner

401

Send first target information to a first wearable device in a case that the second wearable device and the first wearable device are in a preset positional relationship, where the first target information includes a first face image

INFORMATION PROCESSING METHOD AND ELECTRONIC DEVICE

CROSS-REFERENCE TO RELATED APPLICATIONS

This application is a continuation of International Application No. PCT/CN2021/088357, filed Apr. 20, 2021, which claims priority to Chinese Patent Application No. 202010310971.1, filed Apr. 20, 2020. The entire contents of each of the above-referenced applications are expressly incorporated herein by reference.

TECHNICAL FIELD

The present disclosure relates to the field of communication technologies, and in particular, to an information processing method and an electronic device.

BACKGROUND

In the related art, when two electronic devices transmit data, one party requesting data transmission needs to first obtain the identity information of the other party (for example: an account name or an account QR code), and perform a series of data touch input (for example: inputting the identity information of the other party for identity authentication) on the electronic device, to transmit data to the electronic device of the other party.

As can be seen from the above, when electronic devices are used for data transmission, the operational complexity of a data transmission process is increased.

SUMMARY

Embodiments of the present disclosure provide an information processing method and an electronic device.

In a first aspect, an embodiment of the present disclosure provides an information processing method, performed by a first wearable device, where the first wearable device includes a first image collector, and the method includes:

obtaining a second face image by the first image collector and receiving a first face image from the second wearable device in a case that the first wearable device and a second wearable device are in a preset positional relationship; and processing first target information from the second wearable device in a case that the first face image matches the second face image.

In a second aspect, an embodiment of the present disclosure further provides an electronic device, where the electronic device is a first wearable device, the first wearable device includes a first image collector, and the electronic device includes:

a receiving module, configured to: obtain a second face image by the first image collector and receive a first face image from the second wearable device in a case that the first wearable device and a second wearable device are in a preset positional relationship; and a first processing module, configured to: process first target information from the second wearable device in a case that the first face image matches the second face image.

In a third aspect, an embodiment of the present disclosure further provides an electronic device, where the electronic device is a second wearable device, the second wearable device includes a second image collector, and the electronic device includes:

a sending module, configured to send first target information to a first wearable device in a case that the second wearable device and the first wearable device are in a preset positional relationship, where the first target information includes a first face image;

where the preset positional relationship includes at least one of the following:

the second wearable device is in a focus area of a first image collector of the first wearable device; or a distance between the first wearable device and the second wearable device is less than or equal to a preset distance.

In a fourth aspect, an embodiment of the present disclosure further provides an electronic device, including: a memory, a processor, and a computer program stored in the memory and executable on the processor, where the computer program, when executed by the processor, performs the steps of the information processing method provided in the first aspect of the embodiments of the present disclosure.

In a fifth aspect, an embodiment of the present disclosure further provides a computer-readable storage medium. The computer-readable storage medium stores a computer program. The computer program, when executed by the processor, performs the steps of the information processing method provided in the first aspect of the embodiments of the present disclosure.

In a sixth aspect, an embodiment of the present disclosure further provides a computer program product, stored in a nonvolatile storage medium. The program product is configured to be executed by at least one processor to perform the steps of the information processing method provided in the first aspect of the embodiments of the present disclosure.

In a seventh aspect, an embodiment of the present disclosure further provides an electronic device, where the electronic device is configured to perform the information processing method provided in the first aspect of the embodiments of the present disclosure.

The information processing method provided by the embodiments of the present disclosure is performed by a first wearable device, where the first wearable device includes a first image collector, and the method includes: obtaining a second face image by the first image collector and receiving a first face image from the second wearable device in a case that the first wearable device and a second wearable device are in a preset positional relationship; and processing first target information from the second wearable device in a case that the first face image matches the second face image. In the embodiments of the present disclosure, matching between the face image obtained by the first image collector on the first wearable device and the face image in the request information received from the second wearable device is performed, and when the matching is successful, it can be determined that the face image obtained by the first image collector is a face image of a user corresponding to the second wearable device that sends the request information, so as to process the first target information from the second wearable device, thereby realizing data interaction operation with the wearable device, avoiding tedious operation on the electronic device, and improving operation convenience of the information processing method.

BRIEF DESCRIPTION OF DRAWINGS

To describe the technical solutions in the embodiments of the present disclosure more clearly, the accompanying drawings used to describe the embodiments or the prior art are briefly described below. It is obvious that the accompanying drawings described below are only some embodiments of the present disclosure. It is apparent to those of ordinary skill in the art that other drawings may be further obtained based on the accompanying drawings without creative effort.

DETAILED DESCRIPTION

The following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

Figure 1:
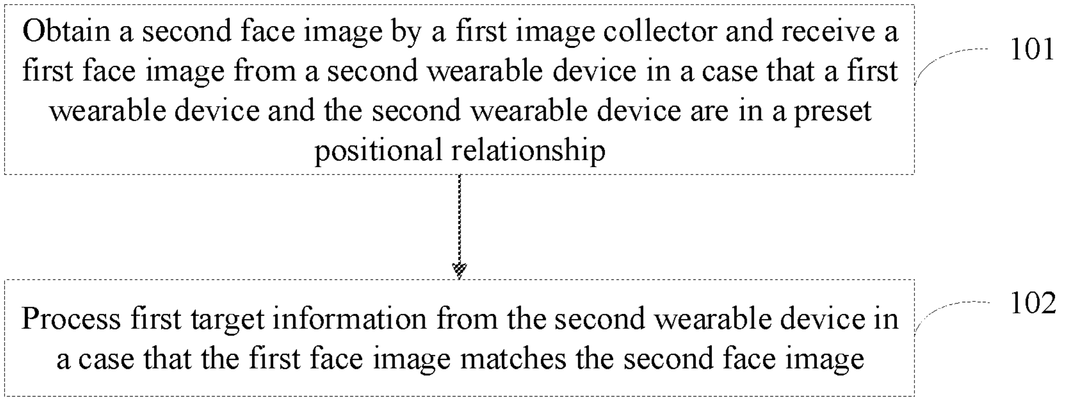
FIG. 1 is a flowchart of a first information processing method provided by an embodiment of the present disclosure.

Referring to FIG. 1. FIG. 1 is a flowchart of a first information processing method provided by an embodiment of the present disclosure. The method is performed by a first wearable device, the first wearable device includes a first image collector, and as shown in FIG. 1, the method may include the following steps:

Step 101: Obtain a second face image by the first image collector and receive a first face image from a second wearable device in a case that the first wearable device and the second wearable device are in a preset positional relationship.

In an exemplary implementation, the first wearable device and the second wearable device may be any wearable device, for example, wearable devices such as smart glasses, smart helmets, smart bracelets, and smart finger rings. In addition, “first” and “second” are only used to distinguish different wearable devices. In an exemplary implementation, the first wearable device and the second wearable device may be different wearable devices of the same model or type. That is, the first wearable device can also send a face image to other wearable devices.

It can be understood that in the above preset relative position, the first image collector on the first wearable device can capture a face image of a user wearing the second wearable device, and the first wearable device and the second wearable device are within effective communication range.

Figure 2:
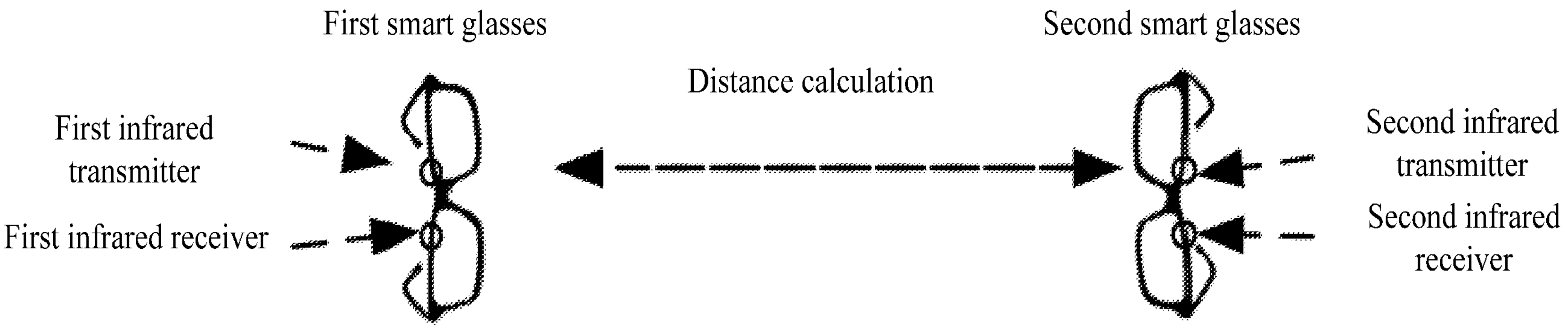
FIG. 2 is a first diagram of an application scenario of a first information processing method provided by an embodiment of the present disclosure.

In some embodiments, a wireless communication module can both be set on the first wearable device and the second wearable device, such as wireless mobile network communication or Bluetooth communication. Then, that the first wearable device and the second wearable device are in preset relative positions can be expressed as: a distance between the first wearable device and the second wearable device is less than or equal to an effective communication distance of the wireless communication modules of the first wearable device and the second wearable device. In an implementation, a distance detection device, such as an infrared distance detection device, may be set on the first wearable device. In some embodiments, as shown in FIG. 2, the first wearable device and the second wearable device are both smart glasses. A first infrared transmitter and a first infrared receiver are provided on first smart glasses, and a second infrared transmitter and a second infrared receiver are provided on second smart glasses, so that the first infrared transmitter and the second infrared receiver can be controlled to emit infrared waves. Then, the first smart glasses can calculate a distance between the first smart glasses and the second smart glasses according to a time taken by the first infrared receiver to receive the infrared wave emitted by the second infrared transmitter, and the second smart glasses can calculate a distance between the first smart glasses and the second smart glasses according to a time taken by the second infrared receiver to receive the infrared wave emitted by the first infrared transmitter.

As an exemplary implementation manner, the preset positional relationship includes at least one of the following:

the second wearable device is in a focus area of a first image collector; or a distance between the first wearable device and the second wearable device is less than or equal to a preset distance.

In an exemplary implementation, the focal point of the first image collector may be a central area a picture taken by the first image collector, for example, a central point of the picture taken by the first image collector. In this implementation manner, the focal point is located in an area where the second wearable device is located, which may mean that the shooting focal point is located on a face image of a user wearing the second wearable device, and the face image is captured by the first image collector.

In practical application, before the first wearable device and the second wearable device are in the preset positional relationship, prompt information may also be output to prompt the user wearing the first wearable device to adjust the posture, so that the first wearable device and the second wearable device are in the preset positional relationship.

In an exemplary implementation, the preset distance may be a minimum value among an effective communication distance of the first wearable device and an effective communication distance of the second wearable device. In this implementation manner, the distance between the first wearable device and the second wearable device is less than or equal to the preset distance, which can ensure that wireless data transmission can be performed between the first wearable device and the second wearable device.

In addition, the preset positional relationship may further include: the first image collector can collect a face image in which the second wearable device is worn, that is, the first image collector is facing the face of the user wearing the second wearable device. For example, the first wearable device is the first smart glasses. In this implementation manner, the first image collector on the first smart glasses faces the front of the first smart glasses, and a user wearing the first smart glasses looks at the face of the user wearing the second wearable device. In this case, it may be determined that the first image collector can capture the face image in which the second wearable device is worn.

In this implementation manner, when the first wearable device and the second wearable device are in the preset positional relationship, it can be ensured that the first image collector on the first wearable device can capture a complete second picture, and can receive the first face image sent by the second wearable device, thereby improving the reliability of the information processing method.

In addition, the obtaining a second face image by the first image collector and receiving a first face image from the second wearable device in a case that the first wearable device and a second wearable device are in a preset positional relationship can also be: in a case that the first wearable device and the second wearable device are in the preset positional relationship and the preset positional relationship is maintained for a first preset time, obtaining the second face image by the first image collector, and receiving the first face image from the second wearable device.

The first preset time may be any preset time length such as 3 seconds, 5 seconds, etc., and the time length may be modified according to the preset value of the user.

In this implementation manner, before matching between the first face image and the second face image is performed, the relative positions of the first wearable device and the second wearable device and the duration of the relative positions are also detected, to prevent the user wearing the first wearable device from erroneously triggering a face matching process and thereby causing erroneous triggering of target data transmission, so that the reliability of the information processing method can be improved.

Step 102: Process first target information from the second wearable device in a case that the first face image matches the second face image.

Figures 3, 4:
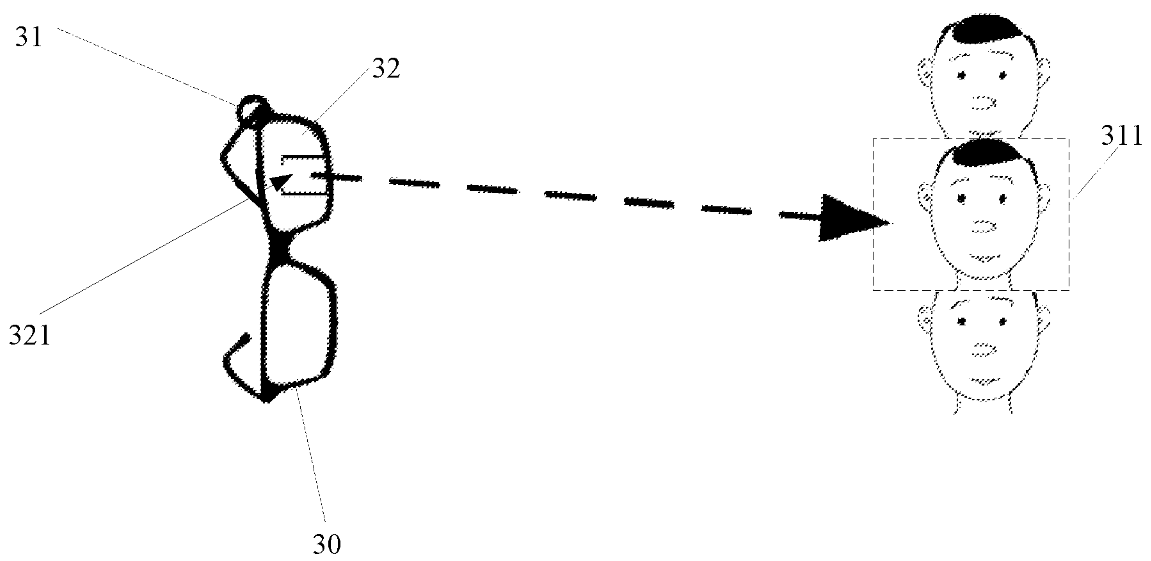
FIG. 3 is a second diagram of an application scenario of a first information processing method provided by an embodiment of the present disclosure.
FIG. 4 is a flowchart of a second information processing method provided by an embodiment of the present disclosure.

It can be understood that, given that the first wearable device and the second wearable device are in preset relative positions, the first image collector can capture the face of the user wearing the second wearable device, that is, the second face image is the face image of the user wearing the second wearable device. In an exemplary implementation, when the first image collector collects the second face image, prompt information may also be output through the display screen, speaker, etc. of the first wearable device, so as to prompt the user wearing the first wearable device to adjust the posture, so that the first image collector can collect the face image of the user wearing the second wearable device. For example, as shown in FIG. 3, in this embodiment, the first wearable device is smart glasses 30, the first image collector on the smart glasses 30 is a camera 31, and the image captured by the camera 31 is displayed on a display lens 32 of the smart glasses. In an exemplary implementation, a focus image 311 in the picture captured by the camera 31 is displayed in a central area 321 of the display lens 32. When the central area 321 shows that the face of the user wearing the second wearable device is incomplete or unclear, prompt information can be displayed on the display lens 32, such as: turning left or turning upwards, to prompt the user wearing the smart glasses to deflect the head to adjust the shooting focus of the camera 31 on the smart glasses 30, so that the photographing focus of the camera focuses on the face image of the user wearing the second wearable device and the face image is clear and complete. In this embodiment, the focus image 311 in the picture captured by the camera 31 includes the face image of the user wearing the second wearable device, that is, the second face image.

In an exemplary implementation, a face recognition device may be configured on the first wearable device to perform face recognition on the first face image and the second face image respectively, and compare face recognition results to determine whether the first face image and the second face image are the face image of a same person, and when the first face image and the second face image are the face image of a same person, it is determined that the first face image matches the second face image.

In addition, the first target information may be any request information such as a request for adding a friend, a request for sending target data, a request for making a call, etc. In an exemplary implementation, the first target information may be sent through an application, such as a social application, a network disk application, etc. In this case, the first account can be an account corresponding to the application, for example: when data is exchanged through the social application, the account can be mobile phone numbers used by the owner of the second wearable device to register the social application or a registration identifier (ID) determined when registering the social application, etc. In addition, the first face image is a face image associated with the first account. In an exemplary implementation, the first face image may be the face image of the owner of the second wearable device. The first face image can be stored in the second wearable device when the owner of the second wearable device initializes and verifies the second wearable device, or can be captured and stored in the second wearable device in a face verification process during the registration of the application.

It should be noted that, in an exemplary implementation, when the first target information is a voice call request, the processing the first target information from the second wearable device may also be: establishing a voice connection with the second wearable device, which are not exhaustively listed herein.

As an exemplary implementation manner, the processing the first target information from the second wearable device includes:

in a case that the first target information is a file transfer request, storing a file corresponding to the file transfer request; and in a case that the first target information is a request for adding a first account as a friend, adding the first account as a friend, where the first account is an account corresponding to the first face image.

In some embodiments, in the implementation manner of adding the first account as a friend in a case that the first target information is a request for adding a first account as a friend, the processing the first target information from the second wearable device can include:

sending a request for adding the first account as a friend to an electronic device connected to the first wearable device, where after receiving the request for adding the first account as a friend, the electronic device sends, through the target application installed on the electronic device, a friend permission request to the first account included in the request for adding the first account as a friend, so as to add the first account as a friend.

In this embodiment, the first target information from the second wearable device can be processed to realize file transfer or add the first account corresponding to the first face image as a friend, thereby simplifying file transfer and operation steps of adding friends.

As an exemplary implementation manner, after the obtaining a second face image by the first image collector and receiving a first face image from the second wearable device in a case that the first wearable device and a second wearable device are in a preset positional relationship, the method further includes:

in a case that the first face image does not match the second face image, skipping processing first target information from the second wearable device, or processing second target information sent by the second wearable device, where the first face image does not match the second face image may be understood as: a user corresponding to the first face image received by the first wearable device is not a user corresponding to the second face image collected by the first image collector; or may be understood as: although the second face image collected by the first image collector and the first face image correspond to a same user, the images do not match.

For example, the first target information is a request for adding a friend. In a case that the user wearing the first wearable device does not look at the user who sent the request for adding a friend, it is determined that the user wearing the first wearable device does not want to add, as a friend, the user who sent the request for adding a friend. In this case, the first target information from the second wearable device is not processed. In this case, it is considered that the second face image and the first face image are a same user, but the images do not match.

In addition, the second target information may be: information of another wearable device connected with the second wearable device (for example, the second target information includes a friend account of the first account in the second wearable device), and the information of another wearable device includes at least the face image associated with the device. In application, the user corresponding to the first face image and the user corresponding to the third face image are located in the same location area, and the users in this area may be a social group (that is, the account corresponding to the third face image is a friend of the account corresponding to the first face image), and any wearable device in this area can send target information to the first wearable device. When the user wearing the first wearable device receives the target information, it is difficult to distinguish which user sent the target information. Therefore, the user wearing the first wearable device controls the first image collector to collect only a face image of a user with whom the user wants to perform data interaction, and matches the collected image with the information of another wearable device carried in the sent second target information, so that when the matching is successful, a user with whom the user wants to perform data interaction is determined.

In some embodiments, the second target information includes a third face image, and the processing the second target information sent by the second wearable device includes:

in a case that the second target information is a request for adding a second account as a friend, adding the second account as a friend in response to the request for adding the second account as a friend, where the second account is an account corresponding to the third face image, and the third face image matches the second face image.

In this way, the third face image matching the second face image can be searched from the second target information, so that through the request for adding a friend of the second account corresponding to the third face image, the matching range of the accounts perform data interaction with the first wearable device can be expanded, thereby improving the practicability of the information processing method.

The information processing method provided by the embodiments of the present disclosure is performed by a first wearable device, where the first wearable device includes a first image collector, and the method includes: obtaining a second face image by the first image collector and receiving a first face image from the second wearable device in a case that the first wearable device and a second wearable device are in a preset positional relationship; and processing first target information from the second wearable device in a case that the first face image matches the second face image. In the embodiments of the present disclosure, matching between the face image obtained by the first image collector on the first wearable device and the face image in the request information received from the second wearable device is performed, and when the matching is successful, it can be determined that the face image obtained by the first image collector is a face image of a user corresponding to the second wearable device that sends the request information, so as to process the first target information from the second wearable device, thereby realizing data interaction operation with the wearable device, avoiding tedious operation on the electronic device, and improving operation convenience of the information processing method.

Referring to FIG. 4. FIG. 4 is a flowchart of a second information processing method provided by an embodiment of the present disclosure. The method is performed by a second wearable device, the second wearable device includes a second image collector, and the method may include the following steps:

Step 401: Send first target information to a first wearable device in a case that the second wearable device and the first wearable device are in a preset positional relationship, where the first target information includes a first face image.

In an exemplary implementation, the preset positional relationship has the same meaning as the preset positional relationship in the information processing method shown in FIG. 1. In addition, the first target information is the same as the first target information in the information processing method shown in FIG. 1 and will not be repeated herein.

For example, if the user wearing the second wearable device wants to add the user wearing the first wearable device as a friend, the second wearable device sends a request for adding a friend to the first wearable device.

When the above method is performed by the second wearable device, the second wearable device may also control the electronic device connected to the second wearable device to send the request for adding a friend.

It should be noted that the second wearable device in this embodiment of the present disclosure may be the same as the second wearable device in the embodiment of the present disclosure as shown in FIG. 1, and the information processing method executed by the second wearable device cooperates with the information processing method performed by the first wearable device in the embodiment of the disclosure shown in FIG. 1, to realize data interaction between the first wearable device and the second wearable device. In addition, the second wearable device also may be understood as an electronic device configured with the second wearable device, and the first wearable device may also be understood as an electronic device configured with the first wearable device, which is not specifically limited herein.

As an exemplary implementation manner, in a case that the second wearable device and the first wearable device are in a preset positional relationship, the sending the first target information to the first wearable device includes:

in a case that the second wearable device and the first wearable device are in the preset positional relationship, obtaining a fourth face image of a user wearing the first wearable device, and obtaining communication information of the third wearable device, where the third wearable device is a wearable device located within a communication range of the second wearable device, and the communication information of each third wearable device includes a communication identifier and a fifth face image associated with the communication identifier;

determining the communication identifier associated with the fifth face image that matches the fourth face image as a communication identifier of the first wearable device; and sending the first target information to the first wearable device according to the communication identifier of the first wearable device.

In an exemplary implementation, the first wearable device and the second wearable device can perform wireless communication, for example: Bluetooth communication, and the communication identifier can be a Bluetooth name or a Bluetooth connection address or the like. Different wearable devices correspond to different communication identifiers. In this way, different wearable devices can be distinguished through the communication identifiers.

In addition, the fifth face image may be a face image of the owner of each wearable device.

In this embodiment, before the second wearable device sends the first target information to the first wearable device, the fourth face image of the user wearing the first wearable device is obtained first, and the communication identifier of the first face image is determined through face matching. In this way, the second wearable device can establish a communication connection with the first wearable device according to the communication identifier, so as to send the first target information to the first wearable device, which improves the practicality of the information processing method.

The information processing method described in this embodiment of the present disclosure corresponds to the information processing method described in the previous embodiment of the present disclosure, so as to jointly realize the data interaction process between the first wearable device and the second wearable device. To avoid repetition, details are not repeated herein.

Figure 5A:
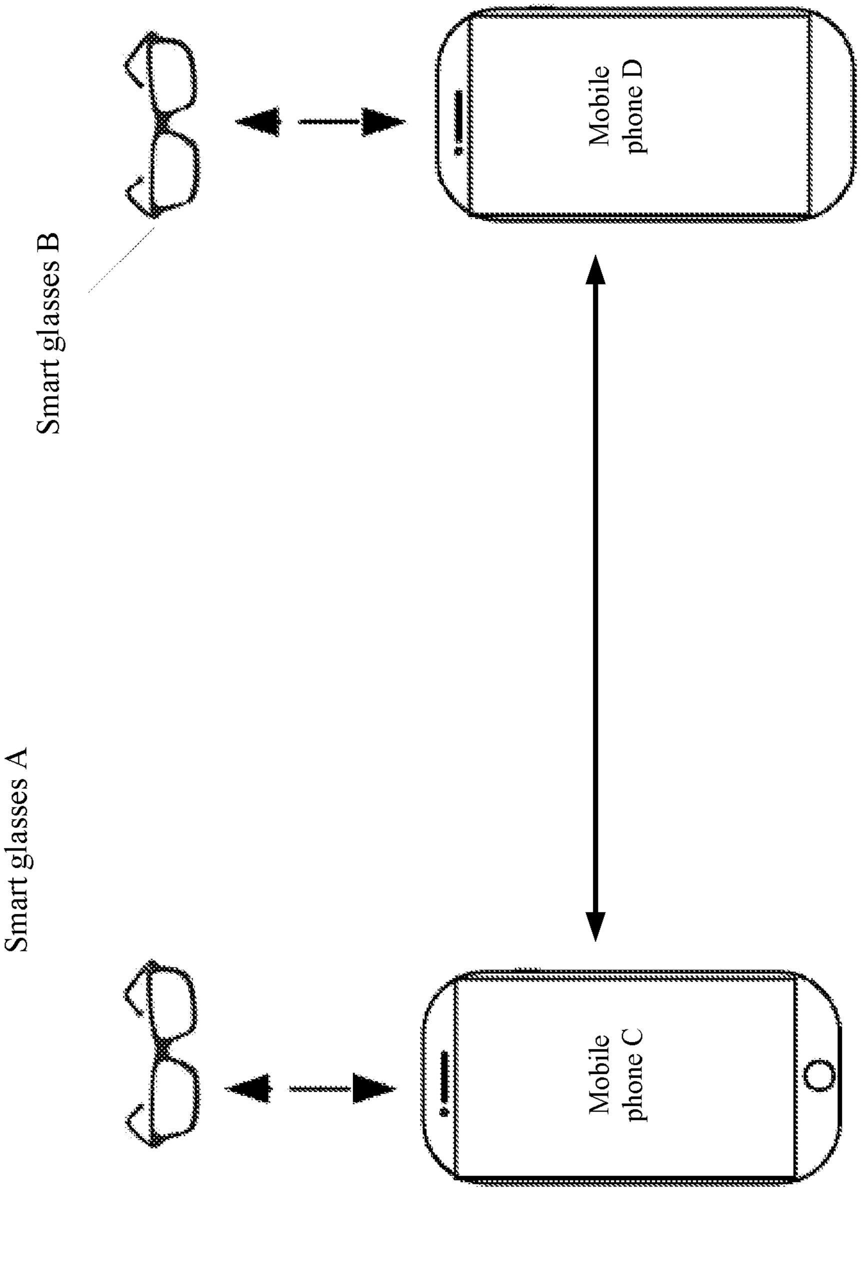
FIG. 5*a* is a diagram of an application scenario of a combination of a first information processing method and a second information processing method provided by an embodiment of the present disclosure.
Figure 5B:
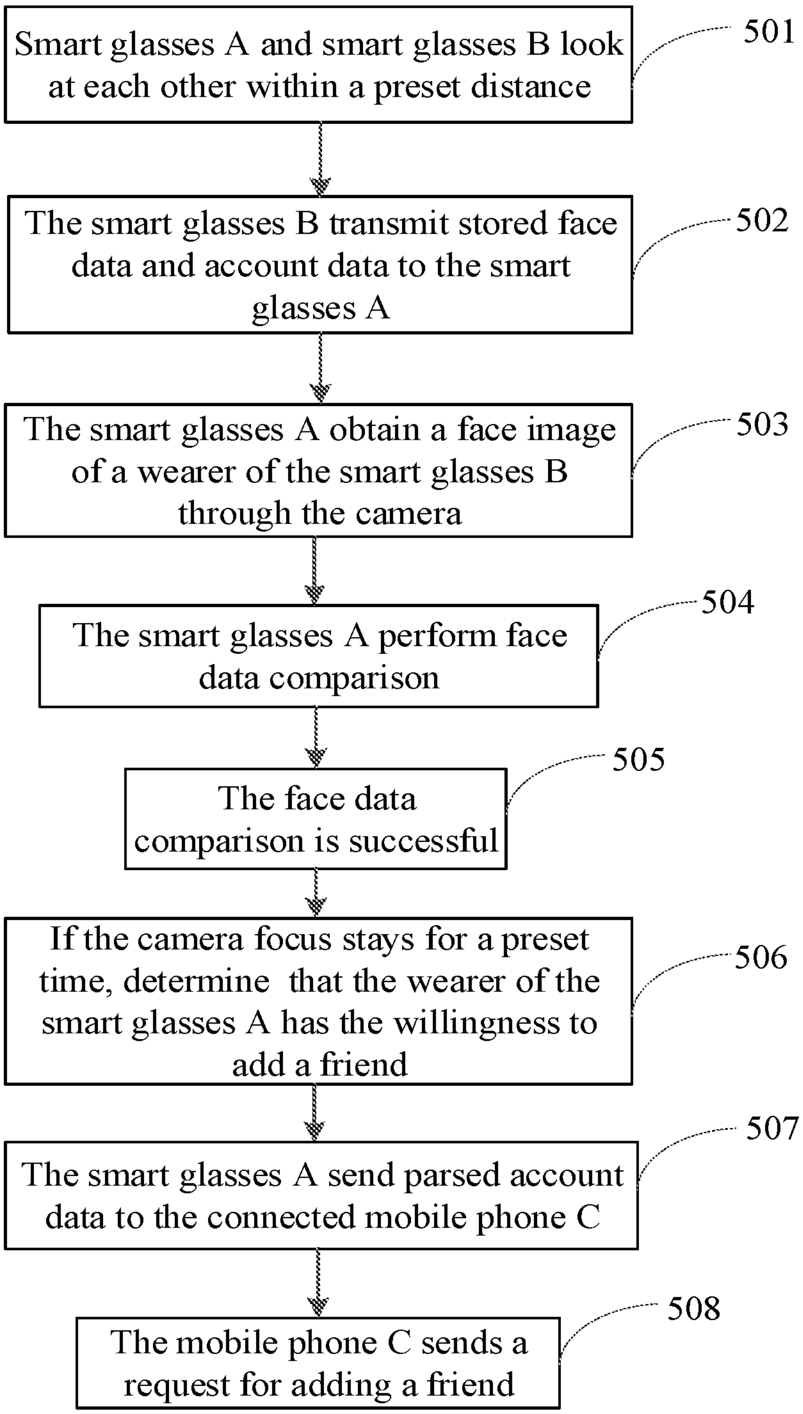
FIG. 5*b* is a flowchart of a data interaction process in the application scenario shown in FIG. 5*a;*

In an exemplary implementation, the information processing method shown in FIG. 1 and the information processing method shown in FIG. 4 can be combined. As shown in FIG. 5*a*, in this embodiment, the first wearable device is smart glasses A, and the second wearable device is smart glasses B. The smart glasses A are connected to mobile phone C, and the smart glasses B are connected to mobile phone D. The information processing methods for smart glasses A and smart glasses B are illustrated as an example. In some embodiments, FIG. 5*b* is a flowchart of a third information processing method:

Step 501: Smart glasses A and smart glasses B look at each other within a preset distance.

In this step, the preset distance may be the effective communication distance between the smart glasses A and the smart glasses B.

Step 502: The smart glasses B transmit stored face data and account data to the smart glasses A.

In this step, the face data may be the data of the first face image in the method embodiments shown in FIG. 1 and FIG. 4, and the account data may be the first account information in the method embodiments shown in FIG. 1 and FIG. 4. In addition, in step 502, the smart glasses B can also send the stored face data and account data to the mobile phone D, so that the mobile phone D transmits the face data and account data to the smart glasses A or the mobile phone C connected to the smart glasses A. In the implementation manner in which the mobile phone D transmits the face data and account data to the mobile phone C connected to the smart glasses A, the smart glasses A obtains the face data and account data through the mobile phone C.

Step 503: The smart glasses A obtain a face image of a wearer of the smart glasses B through the camera.

In this step, the camera may be the first image collector in the method embodiment shown in FIG. 1, and the face image may be the second face image in the method embodiment shown in FIG. 1.

Step 504: The smart glasses A perform face data comparison.

In this step, the face data comparison can be understood as: matching between the first face image and the second face image is performed.

Step 505: The face data comparison is successful.

In this step, the successful face data comparison can also be understood as: the first face image matches the second face image.

In this embodiment, step 506 is executed when the first face image matches the second face image.

Step 506: If the camera focus stays for a preset time, determine that the wearer of the smart glasses A has the willingness to add a friend.

In this step, the camera focus may have the same meaning as the shooting focus of the first image collector in the method embodiment shown in FIG. 1, and that the camera focus stays for the preset time can be understood as: the shooting focus matches the location of the second wearable device, and the duration of the matching is greater than or equal to a first preset time.

In this embodiment, step 507 is executed when it is determined that the wearer of the smart glasses A has the willingness to add a friend.

Step 507: The smart glasses A send parsed account data to the connected mobile phone C.

In this embodiment, the mobile phone C connected to the smart glasses A may be understood as the mobile phone C configured with the smart glasses A. In an exemplary implementation, the parsed account data can be understood as a data form that is obtained by analyzing the account data sent by the smart glasses B and that is convenient for the mobile phone C to identify and process, so that after the mobile phone C receives the account data in this data form, the mobile phone C can accurately identify the account data and send a request for adding a friend to the account data.

Step 508: The mobile phone C sends a request for adding a friend.

In this step, that the mobile phone C sends the request for adding a friend can be understood as: the mobile phone C sends, to the account data sent by the smart glasses B, the request for adding a friend.

In an exemplary implementation, the face data and account data transmitted from the smart glasses B to the smart glasses A in step 502 can also be regarded as a request for adding a friend. Then, in this step, the mobile phone C can send a friend permission request message to the account data sent by the smart glasses B.

The third information processing method provided in the embodiments of the present disclosure can realize the various processes in the information processing method embodiments shown in FIG. 1 and FIG. 4. To avoid repetition, details are not described herein again.

Figure 6:
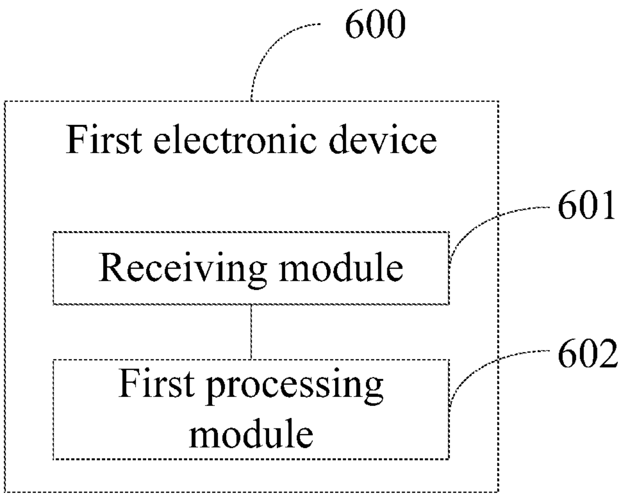
FIG. 6 is a first structural diagram of a first electronic device according to an embodiment of the present disclosure.

Referring to FIG. 6, FIG. 6 is a structural diagram of a first electronic device provided by an embodiment of the present disclosure. The electronic device is a first wearable device, the first wearable device includes a first image collector, and as shown in FIG. 6, the electronic device 600 further includes:

a receiving module 601, configured to: obtain a second face image by the first image collector and receive a first face image from the second wearable device in a case that the first wearable device and a second wearable device are in a preset positional relationship; and a first processing module 602, configured to: process first target information from the second wearable device in a case that the first face image matches the second face image.

In some embodiments, the preset positional relationship includes at least one of the following:

the second wearable device is in a focus area of a first image collector; or a distance between the first wearable device and the second wearable device is less than or equal to a preset distance.

Figure 7:
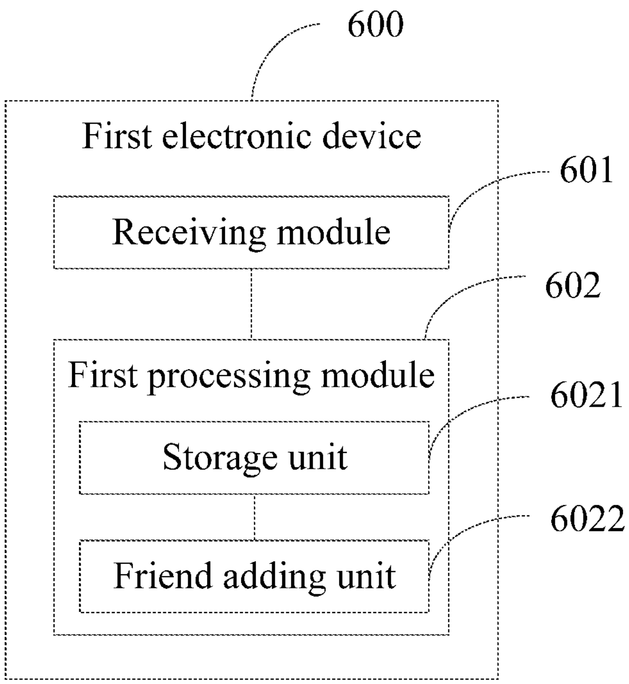
FIG. 7 is a second structural diagram of a first electronic device according to an embodiment of the present disclosure.

In some embodiments, as shown in FIG. 7, the first processing module 602 includes:

a storage unit 6021, configured to: when the first target information is a file transfer request, store a corresponding file in the file transfer request; and a friend adding unit 6022, configured to: in a case that the first target information is a request for adding a first account as a friend, add the first account as a friend, where the first account is an account corresponding to the first face image.

Figure 8:
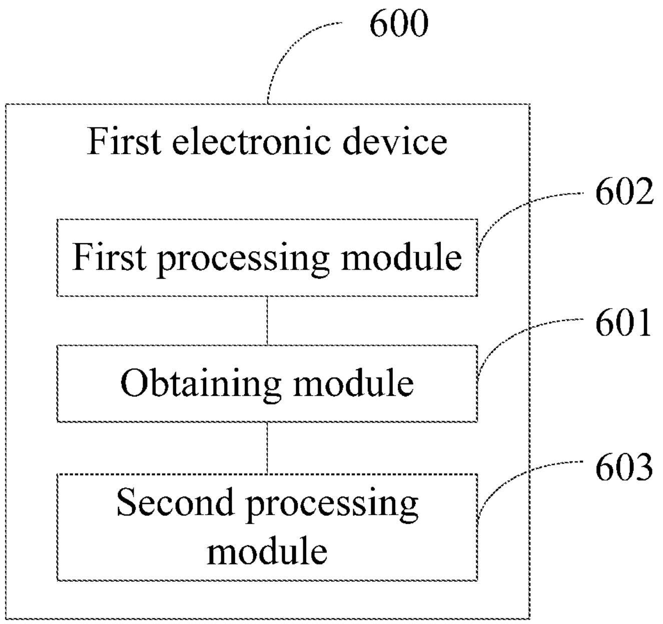
FIG. 8 is a third structural diagram of a first electronic device according to an embodiment of the present disclosure.

In some embodiments, as shown in FIG. 8, the first electronic device 600 further includes:

a second processing module 603, configured to: after obtaining a second face image through the first image collector and receiving a first face image from the second wearable device in a case that the first wearable device and a second wearable device are in a preset positional relationship, in a case that the first face image does not match the second face image, skip processing first target information from the second wearable device, or process second target information sent by the second wearable device.

In some embodiments, the second target information includes a third face image, and the first processing module 602 is configured to:

in a case that the second target information is a request for adding a second account as a friend, add the second account as a friend in response to the request for adding the second account as a friend, where the second account is an account corresponding to the third face image, and the third face image matches the second face image. The electronic device provided in the embodiments of the present disclosure can implement each process in the embodiment of the information processing method shown in FIG. 1. To avoid repetition, details are not described herein again.

Figure 9:
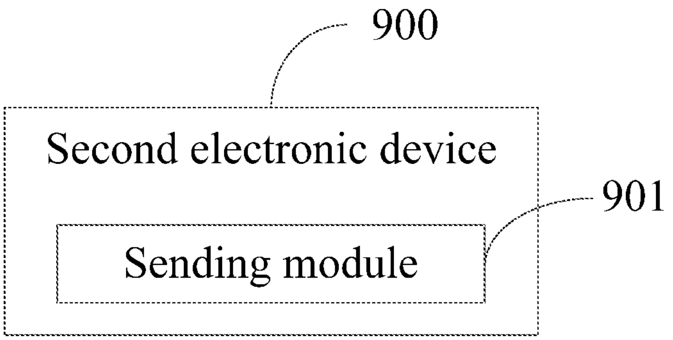
FIG. 9 is a first structural diagram of a second electronic device according to an embodiment of the present disclosure.

Referring to FIG. 9, FIG. 9 is a structural diagram of a second electronic device provided by an embodiment of the present disclosure. The electronic device is a second wearable device, the second wearable device includes a second image collector, and as shown in FIG. 9, the electronic device 900 includes:

a sending module 901, configured to send first target information to a first wearable device in a case that the second wearable device and the first wearable device are in a preset positional relationship, where the first target information includes a first face image.

Figure 10:
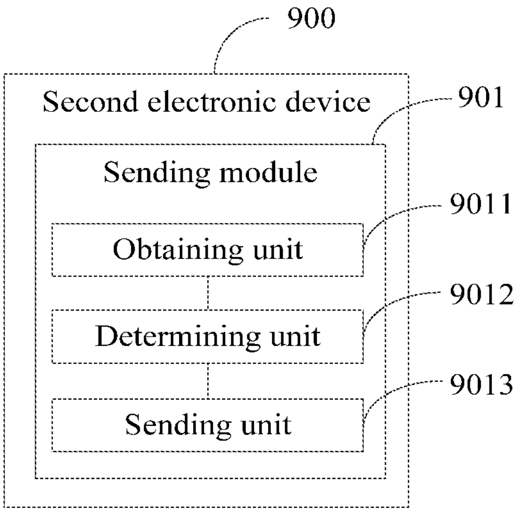
FIG. 10 is a second structural diagram of a second electronic device according to an embodiment of the present disclosure.

In some embodiments, as shown in FIG. 10, the sending module 901 includes:

an obtaining unit 9011, configured to: in a case that the second wearable device and the first wearable device are in the preset positional relationship, obtain a fourth face image on which the first wearable device is worn, and obtain communication information of the third wearable device, where the third wearable device is a wearable device located within a communication range of the second wearable device, and the communication information of each third wearable device includes a communication identifier and a fifth face image associated with the communication identifier;

a determining unit 9012, configured to determine the communication identifier associated with the fifth face image that matches the fourth face image as a communication identifier of the first wearable device; and a sending unit 9013, configured to send the first target information to the first wearable device according to the communication identifier of the first wearable device.

The electronic device provided by the embodiments of the present disclosure can implement each process in the embodiment of the information processing method shown in FIG. 4, which is not repeated herein in order to avoid repetition.

In this embodiment, the foregoing first electronic device or second electronic device may be a mobile phone, a tablet personal computer, a laptop computer, a personal digital assistant (PDA), or a Mobile Internet Device (MID) configured with a wearable device, a wearable device, or the like.

Figure 11:
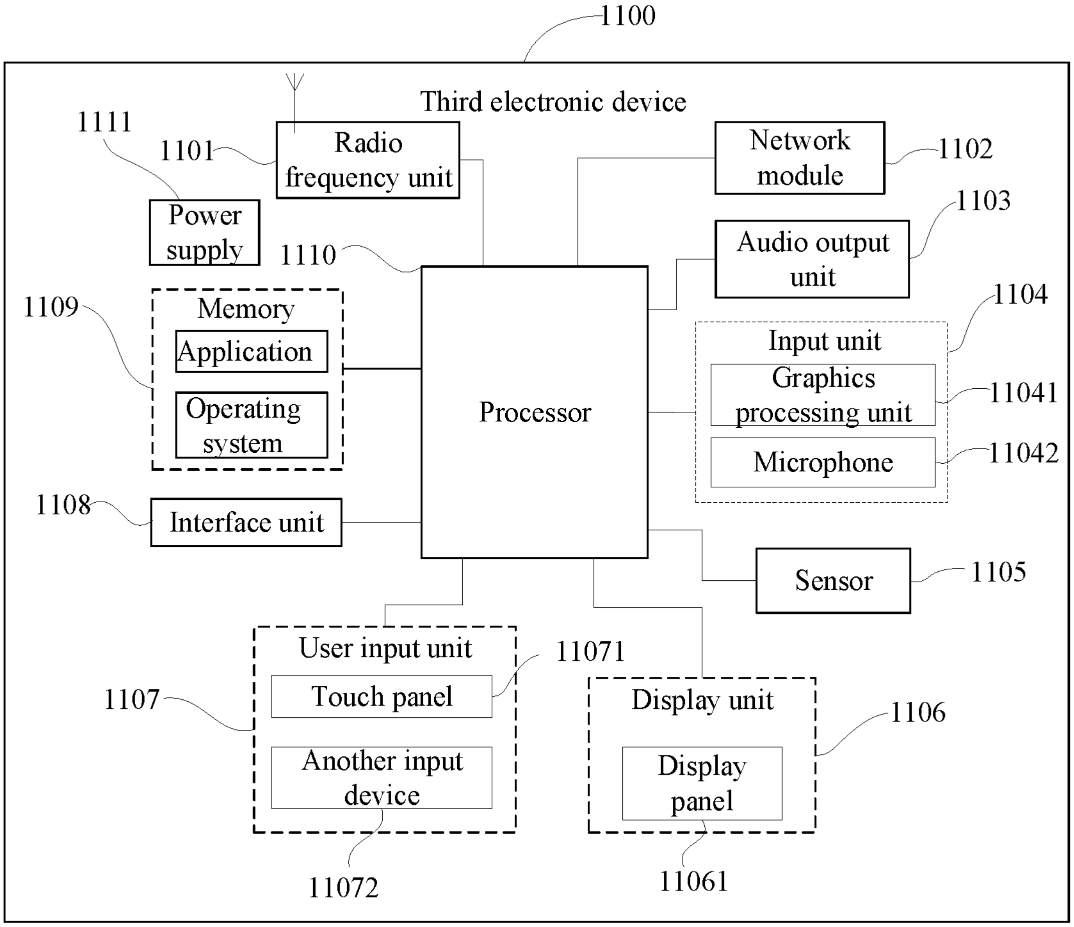
FIG. 11 is a third structural diagram of a third electronic device according to an embodiment of the present disclosure.

Referring to FIG. 11, FIG. 11 is a schematic structural diagram of hardware of a third electronic device implementing the embodiments of the present disclosure. The electronic device 1100 includes but is not limited to: a radio frequency unit 1101, a network module 1102, an audio output unit 1103, an input unit 1104, a sensor 1105, a display unit 1106, a user input unit 1107, an interface unit 1108, a memory 1109, a processor 1110, a power supply 1111, and other components. A person skilled in the art may understand that a structure of the electronic device shown in FIG. 11 constitutes no limitation on the electronic device, and the electronic device may include more or fewer components than those shown in the figure, or have a combination of some components, or have a different component arrangement. In this embodiment of the present disclosure, the electronic device includes but is not limited to a mobile phone, a tablet computer, a notebook computer, a palmtop computer, an in-vehicle terminal, a wearable device, a pedometer, and the like.

In an embodiment, the electronic device 1100 is a first wearable device or an electronic device configured with a first wearable device, where the first wearable device includes a first image collector.

The processor 1110 is configured to:

in a case that the first wearable device and a second wearable device are in a preset positional relationship, control the radio frequency unit 1101 to obtain a second face image by the first image collector, and receive a first face image from the second wearable device; and process first target information from the second wearable device in a case that the first face image matches the second face image.

In some embodiments, the preset positional relationship includes at least one of the following:

the second wearable device is in a focus area of a first image collector; or a distance between the first wearable device and the second wearable device is less than or equal to a preset distance.

In some embodiments, the processing the first target information from the second wearable device performed by the processor 1110 includes:

in a case that the first target information is a file transfer request, storing a file corresponding to the file transfer request; and in a case that the first target information is a request for adding a first account as a friend, adding the first account as a friend, where the first account is an account corresponding to the first face image.

In some embodiments, after performing the obtaining a second face image by the first image collector and receiving a first face image from the second wearable device in a case that the first wearable device and a second wearable device are in a preset positional relationship; the processor 1110 is further configured to:

in a case that the first face image does not match the second face image, skip processing first target information from the second wearable device, or process second target information sent by the second wearable device.

In some embodiments, the second target information includes a third face image, and the processing, by the processor 1110, the second target information sent by the second wearable device includes:

in a case that the second target information is a request for adding a second account as a friend, adding the second account as a friend in response to the request for adding the second account as a friend, where the second account is an account corresponding to the third face image, and the third face image matches the second face image.

In this implementation manner, the third electronic device can perform each process in the method embodiment shown in FIG. 1. To avoid repetition, details are not described herein.

In another embodiment, the electronic device 1100 is a second wearable device or an electronic device configured with a second wearable device, where the second wearable device includes a second image collector.

The processor 1110 is configured to:

control the radio frequency unit 1101 to send first target information to a first wearable device in a case that the second wearable device and the first wearable device are in a preset positional relationship, where the first target information includes a first face image.

In some embodiments, the controlling, by the processor 1110, the radio frequency unit 1101 to send the first target information to the first wearable device in a case that the second wearable device and the first wearable device are in a preset positional relationship includes:

in a case that the second wearable device and the first wearable device are in the preset positional relationship, obtaining a fourth face image on which the first wearable device is worn, and obtaining communication information of the third wearable device, where the third wearable device is a wearable device located within a communication range of the second wearable device, and the communication information of each third wearable device includes a communication identifier and a fifth face image associated with the communication identifier;

determining the communication identifier associated with the fifth face image that matches the fourth face image as a communication identifier of the first wearable device; and controlling the radio frequency unit 1101 to send the first target information to the first wearable device according to the communication identifier of the first wearable device.

In this implementation manner, the third electronic device can perform each process in the method embodiment shown in FIG. 4. To avoid repetition, details are not described herein.

It should be understood that, in this embodiment of the present disclosure, the radio frequency unit 1101 may be configured to receive and send information or a signal in a call process. In some embodiments, after receiving downlink data from a base station, the radio frequency unit sends the downlink data to the processor 1110 for processing. In addition, the radio frequency unit sends uplink data to the base station. Usually, the radio frequency unit 1101 includes but is not limited to an antenna, at least one amplifier, a transceiver, a coupler, a low noise amplifier, a duplexer, and the like. In addition, the radio frequency unit 1101 may communicate with a network and another device through a wireless communication system.

The electronic device provides users with wireless broadband Internet access through the network module 1102, for example, helps users receive and send e-mails, browse web pages, and access streaming media.

The audio output unit 1103 may convert audio data received by the radio frequency unit 1101 or the network module 1102 or stored in the memory 1109 into an audio signal and output the audio signal as a sound. In addition, the audio output unit 1103 may further provide an audio output (for example, call signal receiving sound or message receiving sound) related to functions performed by the electronic device 1100. The audio output unit 1103 includes a speaker, a buzzer, a telephone receiver, and the like.

The input unit 1104 is configured to receive an audio signal or a video signal. The input unit 1104 may include a Graphics Processing Unit (GPU) 11041 and a microphone 11042. The graphics processing unit 11041 processes image data of a static picture or a video obtained by an image capture apparatus (such as a camera) in a video capture mode or an image capture mode. A processed image frame may be displayed on the display unit 1106. The image frame processed by the graphics processor 11041 may be stored in the memory 1109 (or another storage medium) or sent by using the radio frequency unit 1101 or the network module 1102. The microphone 11042 may receive a sound and can process such sound into audio data. Processed audio data may be converted, in a call mode, into a format that can be sent to a mobile communication base station by using the radio frequency unit 1101 for output.

The electronic device 1100 further includes at least one sensor 1105, for example, a light sensor, a motion sensor, and another sensor. In some embodiments, the light sensor includes an ambient light sensor and a proximity sensor. The ambient light sensor may adjust luminance of the display panel 11061 based on brightness of ambient light. The proximity sensor may turn off the display panel 11061 and/or backlight when the electronic device 1100 moves close to an ear. As a type of the motion sensor, an accelerometer sensor may detect an acceleration value in each direction (generally, three axes), and detect a value and a direction of gravity when the accelerometer sensor is static, and may be used for recognizing a posture of the electronic device (such as screen switching between landscape and portrait modes, a related game, or magnetometer posture calibration), a function related to vibration recognition (such as a pedometer or a knock), and the like. The sensor 1105 may further include a fingerprint sensor, a pressure sensor, an iris sensor, a molecular sensor, a gyroscope, a barometer, a hygrometer, a thermometer, an infrared sensor, and the like. Details are not described herein.

The display unit 1106 is configured to display information entered by a user or information provided for a user. The display unit 1106 may include a display panel 11061. The display panel 11061 may be configured in a form of a Liquid Crystal Display (LCD), an Organic Light-Emitting Diode (OLED), or the like.

The user input unit 1107 may be configured to: receive input digital or character information, and generate key signal input related to a user setting and function control of the electronic device. In some embodiments, the user input unit 1107 includes a touch panel 11071 and another input device 11072. The touch panel 11071, also called a touch screen, may collect touch operation on or near the touch panel by users (for example, operation on the touch panel 11071 or near the touch panel 11071 by fingers or any suitable objects or accessories such as a touch pen by the users). The touch panel 11071 may include two parts: a touch detection apparatus and a touch controller. The touch detection apparatus detects a touch location of the user, detects a signal brought by the touch operation, and sends the signal to the touch controller. The touch controller receives touch information from the touch detection apparatus, converts the touch information into touch point coordinates, sends the touch point coordinates to the processor 1110, and receives and executes a command sent by the processor 1110. In addition, the touch panel 11071 may be implemented in various types such as a resistor, a capacitor, an infrared ray, or a surface acoustic wave. The user input unit 1107 may include other input devices 11072 in addition to the touch panel 11071. In some embodiments, the another input device 11072 may include but is not limited to a physical keyboard, a functional button (such as a volume control button or a power on/off button), a trackball, a mouse, and a joystick. Details are not described herein.

Further, the touch panel 11071 may cover the display panel 11061. When detecting a touch operation on or near the touch panel, the touch panel 11071 transmits the touch operation to the processor 1110 to determine a type of a touch event. Then, the processor 1110 provides corresponding visual output on the display panel 11061 based on the type of the touch event. Although in FIG. 11, the touch panel 11071 and the display panel 11061 are configured as two independent components to implement input and output functions of the electronic device, in some embodiments, the touch panel 11071 and the display panel 11061 can be integrated to implement the input and output functions of the electronic device. Details are not limited herein.

The interface unit 1108 is an interface for connecting an external apparatus with the electronic device 1100. For example, the external apparatus may include a wired or wireless headset port, an external power supply (or a battery charger) port, a wired or wireless data port, a memory card port, a port for connecting an apparatus having an identification module, an audio input/output (I/O) port, a video I/O port, a headset port, and the like. The interface unit 1108 may be configured to receive input from an external apparatus (for example, data information and power) and transmit the received input to one or more elements in the electronic device 1100, or may be configured to transmit data between the electronic device 1100 and the external apparatus.

The memory 1109 may be configured to store a software program and various data. The memory 1109 may mainly include a program storage area and a data storage area. The program storage area may store an operating system, an application required by at least one function (such as a sound play function or an image play function), and the like. The data storage area may store data (such as audio data or an address book) created based on use of the mobile phone, and the like. In addition, the memory 1109 may include a high-speed random access memory, and may further include a nonvolatile memory, for example, at least one magnetic disk storage device, a flash storage device, or another volatile solid-state storage device.

The processor 1110 is a control center of the electronic device, connects all parts of the entire electronic device by using various interfaces and lines, and performs various functions of the electronic device and data processing by running or executing a software program and/or a module that are/is stored in the memory 1109 and by invoking data stored in the memory 1109, to overall monitor the electronic device. In some embodiments, the processor 1110 may include one or more processing units. In some embodiments, an application processor and a modem processor may be integrated into the processor 1110. The application processor mainly processes an operating system, a user interface, an application, and the like. The modem processor mainly processes wireless communications. It can be understood that, the modem processor may not be integrated into the processor 1110.

The electronic device 1100 may further include the power supply 1111 (for example, a battery) supplying power to each component. In some embodiments, the power supply 1111 may be logically connected to the processor 1110 by using a power management system, so as to implement functions such as charging management, discharging management, and power consumption management by using the power management system.

In addition, the electronic device 1100 includes some function modules not shown. Details are not described herein.

An embodiment of the present disclosure further provides an electronic device, including a processor 1110, a memory 1109, and a computer program stored in the memory 1109 and executable on the processor 1110. The computer program, when executed by the processor 1110, may implement each process of the above-mentioned embodiments of the information processing method performed by the first wearable device or configured with the first wearable device. In some embodiments, when the computer program is executed by the processor 1110, each process of the above-mentioned embodiment of the information processing method performed by the second wearable device or configured with the second wearable device can be realized, and the same technical effect can be achieved. To avoid repetition, details are not described herein again.

It should be noted that in this specification, the term "include", "including", or any other variant is intended to cover non-exclusive inclusion, so that a process, method, article, or apparatus that includes a series of elements includes not only those elements but also other elements that are not explicitly listed, or includes elements inherent to such a process, method, article, or apparatus. In the absence of more restrictions, an element defined by the statement "including a . . . " does not preclude the presence of other identical elements in the process, method, article, or apparatus that includes the element.

It may be clearly understood by a person skilled in the art that, for convenience and brevity of description, for an exemplary working process of the foregoing described system, apparatus, and unit, reference may be made to a corresponding process in the foregoing method embodiments, and details are not described herein again.

In the embodiments provided in this application, it should be understood that the disclosed apparatus and method may be implemented in another manner. For example, the described apparatus embodiment is merely an example. For example, the unit division is merely logical function division. In actual implementation, there may be another division manner. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one place, or may be distributed on multiple network units. Some or all of the units may be selected based on an actual requirement to implement the objectives of the solutions in the embodiments.

In addition, functional units in the embodiments of the present disclosure may be integrated into one processing unit, or each of the units may exist alone physically, or two or more units are integrated into one unit.

Based on the descriptions of the foregoing implementations, a person skilled in the art may understand that the method in the foregoing embodiment may be implemented by software in addition to a necessary universal hardware platform or by hardware only. Based on such an understanding, the technical solutions of the present disclosure may be implemented in a form of a software product. The computer software product is stored in a storage medium (for example, a ROM/RAM, a magnetic disk, or an optical disc), and includes several instructions for instructing an electronic device (which may be a mobile phone, a computer, a server, an air conditioner, a network device, or the like) to perform the methods described in the embodiments of the present disclosure.

A person of ordinary skill in the art may understand that all or some of the processes in the foregoing method embodiments may be implemented by using a computer program to control related hardware. The program may be stored in a computer readable storage medium. When the program is executed, the processes in the foregoing method embodiments may be performed. The foregoing storage medium may be a magnetic disc, an optical disc, a Read-Only Memory (ROM), a Random Access Memory (RAM), or the like.

It can be understood that the embodiments described in the present disclosure may be implemented by hardware, software, firmware, middleware, microcode, or a combination thereof. For implementation with hardware, the module, unit, and subunit may be implemented in one or more Application Specific Integrated Circuits (ASIC), a Digital Signal Processing (DSP), a DSP Device (DSPD), a Programmable Logic Device (PLD), a Field-Programmable Gate Array (FPGA), general processors, controllers, micro-controllers, micro-processors, and other electronic units for implementing the functions of the present disclosure, or their combinations.

For implementation with software, technologies described in the embodiments of the present disclosure may be implemented by executing functional modules (for example, a process and a function) in the embodiments of the present disclosure. A software code may be stored in the memory and executed by the processor. The memory may be implemented in the processor or outside the processor.

The embodiments of the present disclosure are described above with reference to the accompanying drawings, but the present disclosure is not limited to the foregoing exemplary implementation manners, and the foregoing exemplary implementation manners are only illustrative and not restrictive. Under the enlightenment of the present disclosure, a person of ordinary skill in the art can make many forms without departing from the purpose of the present disclosure and the protection scope of the claims, and all of these fall within the protection of the present disclosure.

The invention claimed is:

1. An information processing method, performed by a first wearable device, wherein the first wearable device comprises a first image collector, the method comprising:

capturing a second face image of a user actually wearing a second wearable device using the first image collector and receiving a stored first face image from the second wearable device when the first wearable device and the second wearable device are in a preset positional relationship, wherein the first face image depicts a face of a registered user that is registered with an application on the second wearable device; and processing first target information comprising a request from the second wearable device, when the first face image matches the second face image indicating that the user actually wearing the second wearable device is the registered user, wherein when the second wearable device and the first wearable device are in the preset positional relationship, a fourth face image of a user wearing the first wearable device is obtained, and communication information of a third wearable device is obtained, wherein the third wearable device is a wearable device located within a communication range of the second wearable device, and the communication information of the third wearable device comprises a fifth face image and a communication identifier associated with the fifth face image, and wherein the communication identifier associated with the fifth face image that matches the fourth face image is determined as a communication identifier of the first wearable device.

2. The method according to claim 1, wherein the preset positional relationship comprises:

a distance between the first wearable device and the second wearable device is less than or equal to a preset distance.

3. The method according to claim 1, wherein the processing the first target information from the second wearable device comprises:

when the request is a file transfer request, storing a file corresponding to the file transfer request; and when the request is a request for adding a first account as a friend, adding the first account as the friend, wherein the first account is an account corresponding to the first face image.

4. The method according to claim 1, wherein after capturing the second face image of the user actually wearing the second wearable device using the first image collector and receiving the stored first face image from the second wearable device, the method further comprises:

when the first face image does not match the second face image, skipping processing the first target information from the second wearable device, or processing second target information sent by the second wearable device, wherein that the first face image does not match the second face image indicates: the registered user depicted by the first face image received by the first wearable device is not the user actually wearing the second wearable device; or although the user actually wearing the second wearable device is the registered user, the first face image and the second face image do not match.

5. The method according to claim 4, wherein the second target information comprises a third face image, and the processing the second target information sent by the second wearable device comprises:

when the second target information is a request for adding a second account as a friend, adding the second account as the friend in response to the request for adding the second account as the friend, wherein the second account is an account corresponding to the third face image, and the third face image matches the second face image.

6. An information processing method, performed by a second wearable device, the method comprising:

sending first target information comprising a request and a stored first face image to a first wearable device when the second wearable device and the first wearable device are in a preset positional relationship, wherein the first face image depicts a face of a registered user that is registered with an application on the second wearable device, wherein the first target information is processed by the first wearable device when the first face image matches a second face image indicating that a user actually wearing the second wearable device is the registered user, wherein the second face image depicts a face of the user actually wearing the second wearable device, wherein the preset positional relationship comprises at least one of the following:

the second wearable device being in a focus area of a first image collector of the first wearable device; or a distance between the first wearable device and the second wearable device being less than or equal to a preset distance, and wherein sending the first target information to the first wearable device comprises:

when the second wearable device and the first wearable device are in the preset positional relationship, obtaining a fourth face image of a user wearing the first wearable device, and obtaining communication information of a third wearable device, wherein the third wearable device is a wearable device located within a communication range of the second wearable device, and the communication information of the third wearable device comprises a communication identifier and a fifth face image associated with the communication identifier;

determining the communication identifier associated with the fifth face image that matches the fourth face image as a communication identifier of the first wearable device; and sending the first target information to the first wearable device according to the communication identifier of the first wearable device.

7. An electronic device, wherein the electronic device is a first wearable device comprising a first image collector, and the electronic device comprises: a memory storing a computer program; and a processor coupled to the memory and configured to execute the computer program to perform operations comprising:

capturing a second face image of a user actually wearing a second wearable device using the first image collector and receiving a stored first face image from the second wearable device when the first wearable device and the second wearable device are in a preset positional relationship, wherein the first face image depicts a face of a registered user that is registered with an application on the second wearable device; and processing first target information comprising a request from the second wearable device, when the first face image matches the second face image indicating that the user actually wearing the second wearable device is the registered user, wherein when the second wearable device and the first wearable device are in the preset positional relationship, a fourth face image of a user wearing the first wearable device is obtained, and communication information of a third wearable device is obtained, wherein the third wearable device is a wearable device located within a communication range of the second wearable device, and the communication information of the third wearable device comprises a fifth face image and a communication identifier associated with the fifth face image, and wherein the communication identifier associated with the fifth face image that matches the fourth face image is determined as a communication identifier of the first wearable device.

8. The electronic device according to claim 7, wherein the preset positional relationship comprises at least one of the following:

the second wearable device being in a focus area of the first image collector; or a distance between the first wearable device and the second wearable device being less than or equal to a preset distance.

9. The electronic device according to claim 7, wherein the processing the first target information from the second wearable device comprises:

when the first target information is a file transfer request, storing a file corresponding to the file transfer request; and when the first target information is a request for adding a first account as a friend, adding the first account as the friend, wherein the first account is an account corresponding to the first face image.

10. The electronic device according to claim 7, wherein after capturing the second face image of the user actually wearing the second wearable device using the first image collector and receiving the stored first face image from the second wearable device, the operations further comprise:

when the first face image does not match the second face image, skipping processing the first target information from the second wearable device, or processing second target information sent by the second wearable device, wherein that the first face image does not match the second face image indicates: the registered user depicted by the first face image received by the first wearable device is not the user actually wearing the second wearable device; or although the user actually wearing the second wearable device is the registered user, the first face image and the second face image do not match.

11. The electronic device according to claim 10, wherein the second target information comprises a third face image, and the processing the second target information sent by the second wearable device comprises:

when the second target information is a request for adding a second account as a friend, adding the second account as the friend in response to the request for adding the second account as the friend, wherein the second account is an account corresponding to the third face image, and the third face image matches the second face image.

12. The method according to claim 1, wherein the preset positional relationship comprises:

the second wearable device being in a focus area of the first image collector.

13. The method according to claim 4, wherein the first target information is sent to the first wearable device according to the communication identifier of the first wearable device.

14. The method according to claim 1, wherein the registered user is an owner of the second wearable device.

* * * * *